United States Patent
Kim et al.

(10) Patent No.: US 9,843,434 B2
(45) Date of Patent: Dec. 12, 2017

(54) METHOD OF CONFIGURING CYCLIC PREFIX FOR SMALL CELL IN WIRELESS COMMUNICATION SYSTEM AND APPARATUS THEREFOR

(71) Applicant: LG ELECTRONICS INC., Seoul (KR)

(72) Inventors: Kitae Kim, Anyang-si (KR); Jaehoon Chung, Anyang-si (KR); Sunam Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/419,635

(22) PCT Filed: Jul. 31, 2013

(86) PCT No.: PCT/KR2013/006875
§ 371 (c)(1),
(2) Date: Feb. 4, 2015

(87) PCT Pub. No.: WO2014/025157
PCT Pub. Date: Feb. 13, 2014

(65) Prior Publication Data
US 2015/0195077 A1    Jul. 9, 2015

Related U.S. Application Data

(60) Provisional application No. 61/679,768, filed on Aug. 5, 2012.

(51) Int. Cl.
*H04L 5/00* (2006.01)
*H04L 27/26* (2006.01)

(52) U.S. Cl.
CPC .......... *H04L 5/0069* (2013.01); *H04L 5/0048* (2013.01); *H04L 27/2607* (2013.01); *H04L 5/0037* (2013.01); *H04L 5/0053* (2013.01)

(58) Field of Classification Search
CPC . H04L 5/0069; H04L 5/0048; H04L 27/2607; H04L 5/0037; H04L 5/0053; H04L 27/2605
See application file for complete search history.

(56) References Cited

U.S. PATENT DOCUMENTS

2009/0190570 A1* 7/2009 Marath ............... H04L 5/02
                                                    370/350
2009/0225882 A1* 9/2009 Yoshida ............ H04L 27/2647
                                                    375/260

(Continued)

FOREIGN PATENT DOCUMENTS

CN      101366214        2/2009
JP  WO 2011135693 A1 * 11/2011 ............. H04B 7/022

OTHER PUBLICATIONS

PCT International Application No. PCT/KR2013/006875, Written Opinion of the International Searching Authority dated Nov. 25, 2013, 1 page.

(Continued)

*Primary Examiner* — Pao Sinkantarakorn
*Assistant Examiner* — Kabir Jahangir
(74) *Attorney, Agent, or Firm* — Lee, Hong, Degerman, Kang & Waimey

(57) ABSTRACT

Disclosed herein is a method of transceiving a signal between a transmitter and a receiver in a wireless communication system. The method includes transceiving the signal in units of a subframe including a plurality of symbols. Each of the plurality of symbols includes a valid symbol and a cyclic prefix, and a length of the cyclic prefix is changed according to a distance between the transmitter and the receiver.

6 Claims, 13 Drawing Sheets

(56) References Cited

U.S. PATENT DOCUMENTS

| | | | |
|---|---|---|---|
| 2010/0149961 A1* | 6/2010 | Lee | H04L 5/0007 370/204 |
| 2010/0208603 A1 | 8/2010 | Ishii | |
| 2010/0208669 A1* | 8/2010 | Chun | H04L 5/0007 370/329 |
| 2010/0246455 A1* | 9/2010 | Nangia | H04L 1/1822 370/280 |
| 2010/0279707 A1* | 11/2010 | Fischer | G01S 5/021 455/456.1 |
| 2010/0322160 A1* | 12/2010 | Yeh | H04L 5/023 370/329 |
| 2011/0044188 A1 | 2/2011 | Luo et al. | |
| 2011/0044255 A1* | 2/2011 | Ikeda | H04L 27/2607 370/328 |
| 2011/0128883 A1* | 6/2011 | Chung | H04B 7/155 370/252 |
| 2011/0188467 A1* | 8/2011 | Kawamura | H04L 5/0053 370/330 |
| 2011/0292917 A1* | 12/2011 | Fan | H04L 5/0023 370/336 |
| 2011/0317608 A1 | 12/2011 | Li et al. | |
| 2012/0008556 A1* | 1/2012 | Noh | H04L 1/1893 370/328 |
| 2012/0044796 A1* | 2/2012 | Yoon | G01S 1/042 370/208 |
| 2012/0044883 A1* | 2/2012 | Jang | H04L 1/0042 370/329 |
| 2012/0076024 A1* | 3/2012 | Ko | H04L 1/0026 370/252 |
| 2012/0099491 A1* | 4/2012 | Lee | H04L 1/0015 370/280 |
| 2012/0099545 A1* | 4/2012 | Han | H04L 1/0028 370/329 |
| 2013/0122822 A1* | 5/2013 | Srinivasan | H04J 11/0073 455/67.13 |

OTHER PUBLICATIONS

State Intellectual Property Office of the People's Republic of China Application Serial No. 201380046336.5, Office Action dated Mar. 31, 2017, 20 pages.

* cited by examiner

FIG. 2
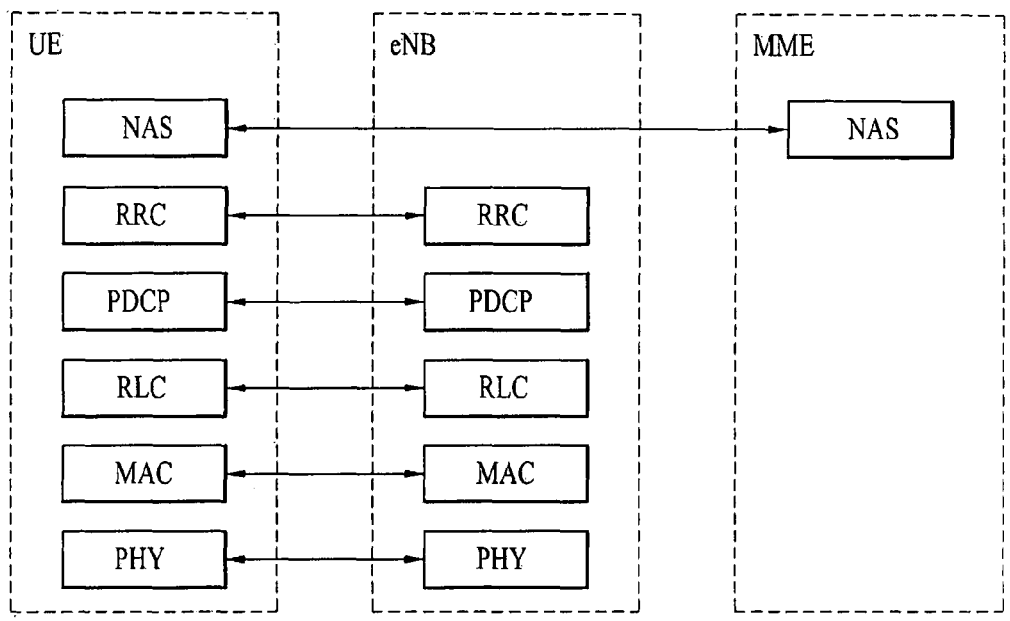
(a) Control-plane protocol stack
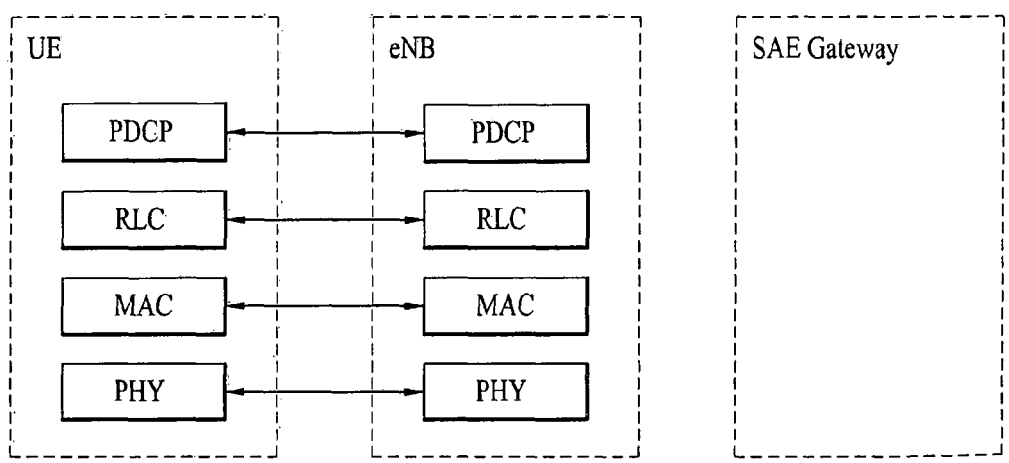
(b) User-plane protocol stack FIG. 8
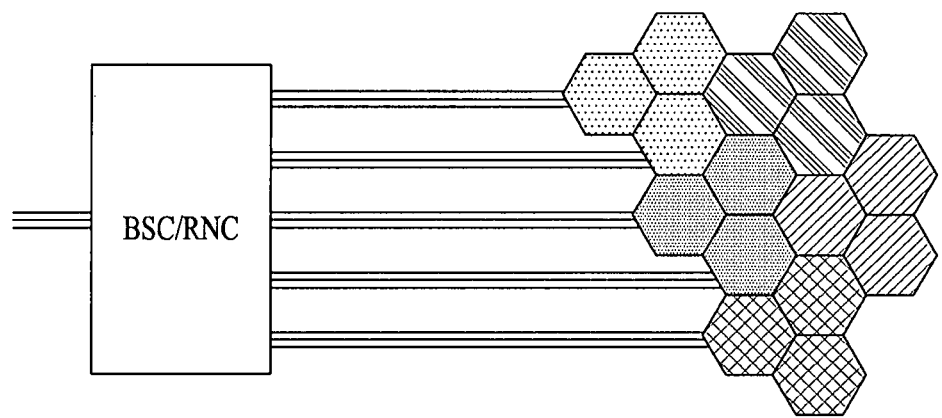
(a)
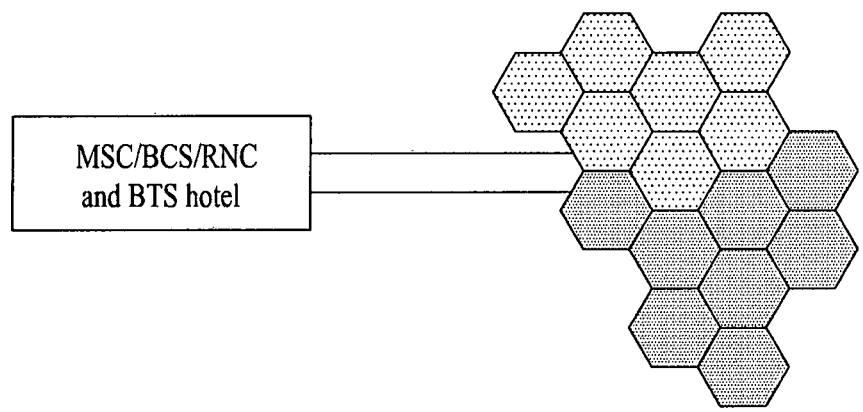
(b)

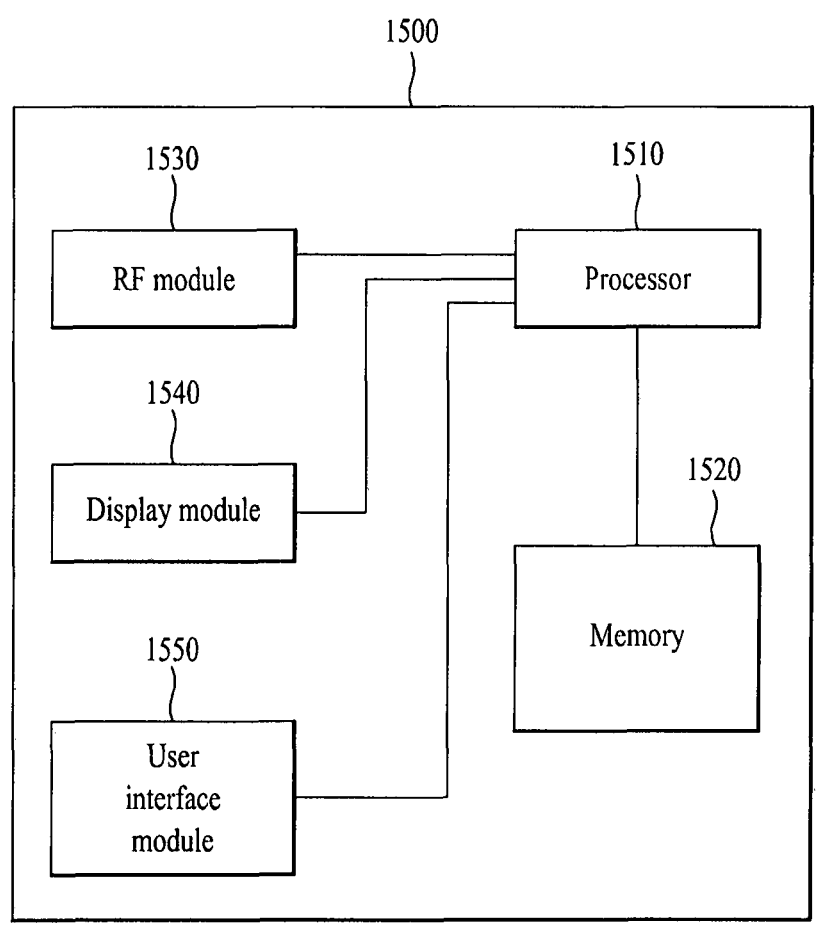

METHOD OF CONFIGURING CYCLIC PREFIX FOR SMALL CELL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2013/006875, filed on Jul. 31, 2013, which claims the benefit of U.S. Provisional Application No. 61/679,768, filed on Aug. 5, 2012, the contents of which are hereby incorporated by reference herein in their entirety.

TECHNICAL FIELD

The present invention relates to a wireless communication system, and more particularly, to a method of configuring a cyclic prefix for a small cell in a wireless communication system and an apparatus therefor.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.44, 3, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention is to provide a method of configuring a cyclic prefix for a small cell in a wireless communication system and an apparatus therefor.

Technical Solution

The object of the present invention can be achieved by providing a method of transceiving a signal between a transmitter and a receiver in a wireless communication system, including transceiving the signal in units of a subframe including a plurality of symbols, wherein each of the plurality of symbols includes a valid symbol and a cyclic prefix, and wherein the length of the cyclic prefix is changed according to a distance between the transmitter and the receiver. If the distance between the transmitter and the receiver is decreased, a length of the cyclic prefix may be decreased.

If the length of the valid symbol is fixed and the length of the cyclic prefix is decreased, a number of symbols included in one subframe may be increased. If a number of symbols included in one subframe is fixed, the length of the valid symbol may be increased.

In another aspect of the present invention, there is provided a method of transceiving a signal between a transmitter and a receiver in a wireless communication system, including transceiving the signal in units of a subframe including a plurality of symbols, wherein each of the plurality of symbols includes a valid symbol and a cyclic prefix, and wherein the length of the cyclic prefix is changed in subframe units.

In another aspect of the present invention, there is provided an apparatus for transceiving a signal in a wireless communication system, including means for transceiving the signal in units of a subframe including a plurality of symbols, wherein each of the plurality of symbols includes a valid symbol and a cyclic prefix, and wherein the length of the cyclic prefix is changed in subframe units.

A first cyclic prefix length may be applied to a subframe of a minimum index included in one radio frame and a second cyclic prefix length may be applied to the remaining subframes, and the first cyclic prefix length may be greater than the second cyclic prefix length. The length of the cyclic prefix applied to one subframe may be set to the same value with respect to the symbols.

Advantageous Effects

According to the present invention, it is possible to more efficiently configure a cyclic prefix for a small cell in a wireless communication system.

The effects of the present invention are not limited to the above-described effects and other effects which are not

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3$^{rd}$ Generation Partnership Project (3GPP) radio access network standard.

FIG. 8 is a diagram showing the concept of a BTS hotel in a DAS.

FIG. 15 is a block diagram showing the configuration of a communication apparatus according to an embodiment of the present invention.

BEST MODE

Figure 1:
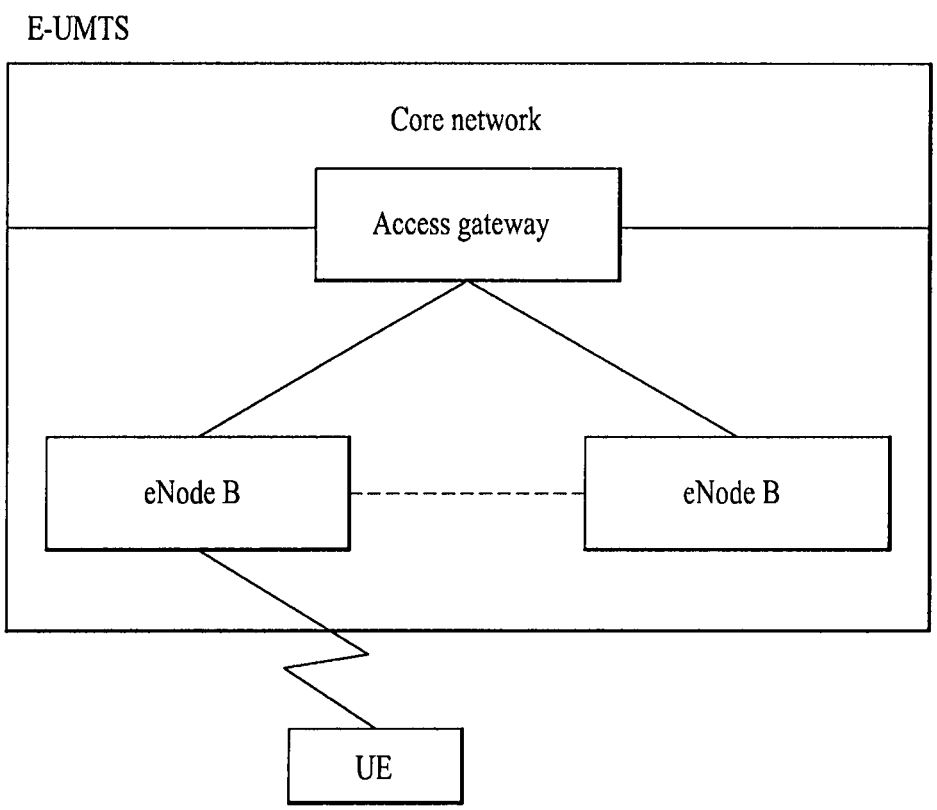
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a 3$^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.4, 3, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
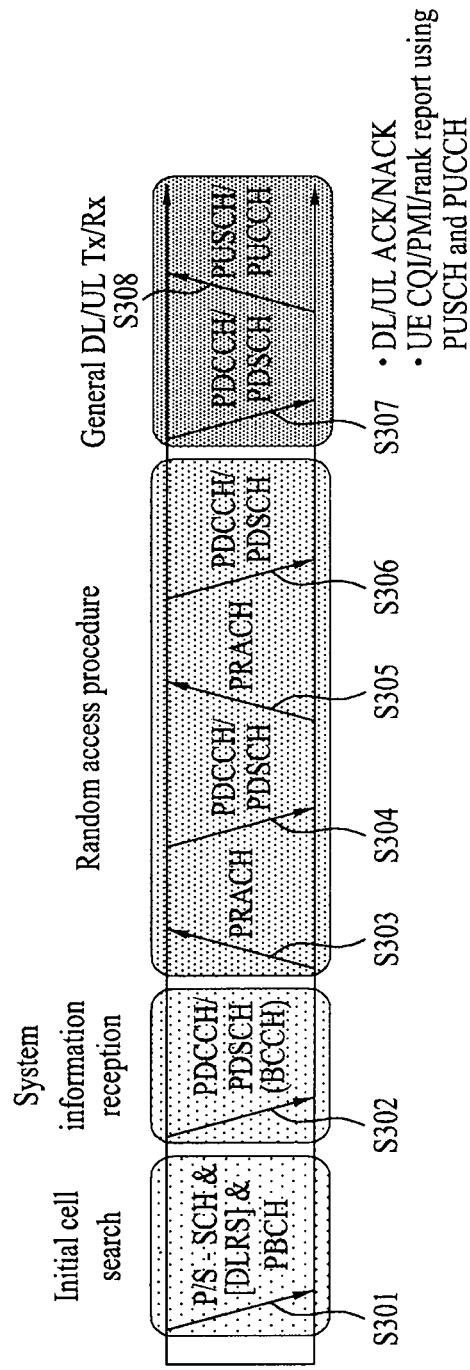
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the MIMO technique, a single antenna path is not used for receiving one message. Instead, in the MIMO technique, data fragments received via several antennas are collected and combined so as to complete data. If the MIMO technique is used, a data transfer rate may be improved within a cell region having a specific size or system coverage may be increased while ensuring a specific data transfer rate. In addition, this technique may be widely used in a mobile communication terminal, a repeater and the like. According to the MIMO technique, it is possible to overcome a limit in transmission amount of conventional mobile communication using a single antenna.

Figure 4:
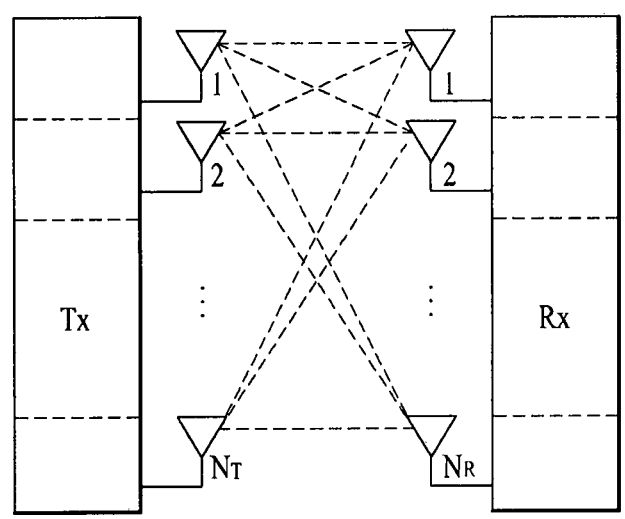
FIG. 4 is a diagram showing the configuration of a multi-antenna communication system.

The configuration of the general multi-antenna (MIMO) communication system is shown in FIG. 4. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1. Here, $R_i$ is the smaller of the two values $N_T$ and $N_R$.

$$R_i = \min(N_T, N_R) \qquad \text{<Equation 1>}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

Figure 7:
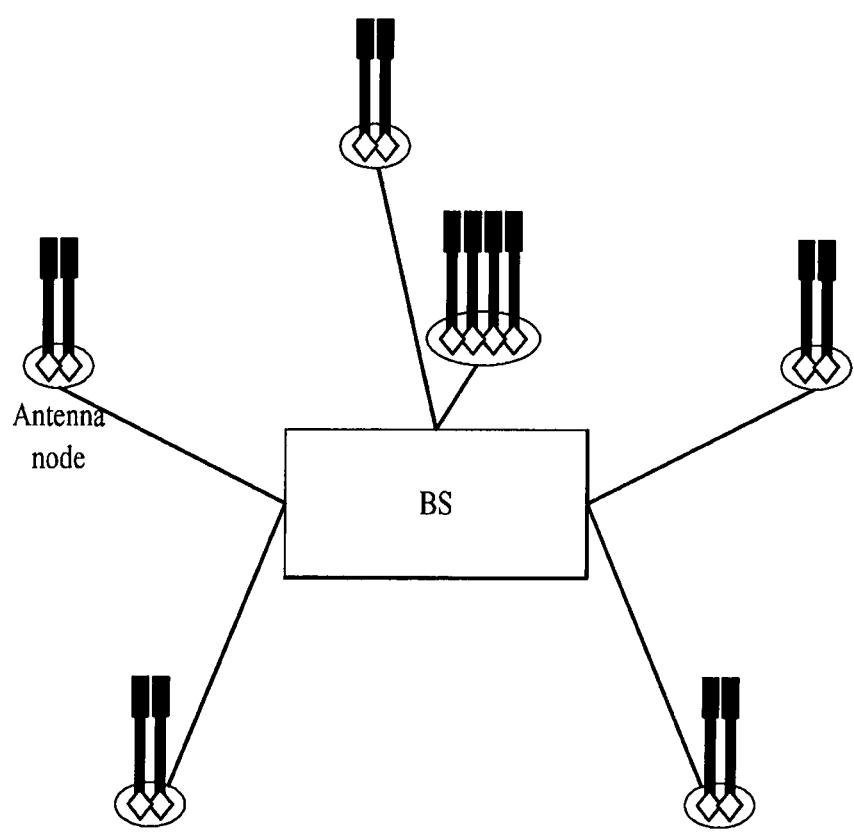
FIG. 7 is a diagram showing the configuration of a distributed antenna system (DAS) in a next-generation communication system.

The communication method of the MIMO system will be described in more detail using mathematical modeling. As shown in FIG. 7, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2.

$$s = [s_1, s_2, \ldots, s_{N_T}]^T \qquad \text{<Equation 2>}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{<Equation 3>}$$

In addition, Ŝ may be expressed using a diagonal matrix P of the transmit powers as shown in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \langle \text{Equation 4} \rangle$$

Considers that the $N_T$ actually transmitted signals $x_1, x_2, \ldots, x_{N_T}$ are configured by applying a weight matrix W to the information vector Ŝ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \langle \text{Equation 5} \rangle$$

$$W\hat{s} = WPs$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_R) \qquad \text{<Equation 6>}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7.

$$\text{\# of streams} \leq \text{rank}(H) \leq \min(N_T, N_R) \qquad \text{<Equation 7>}$$

where, "# of streams" denotes the number of streams. One stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

Figure 5:
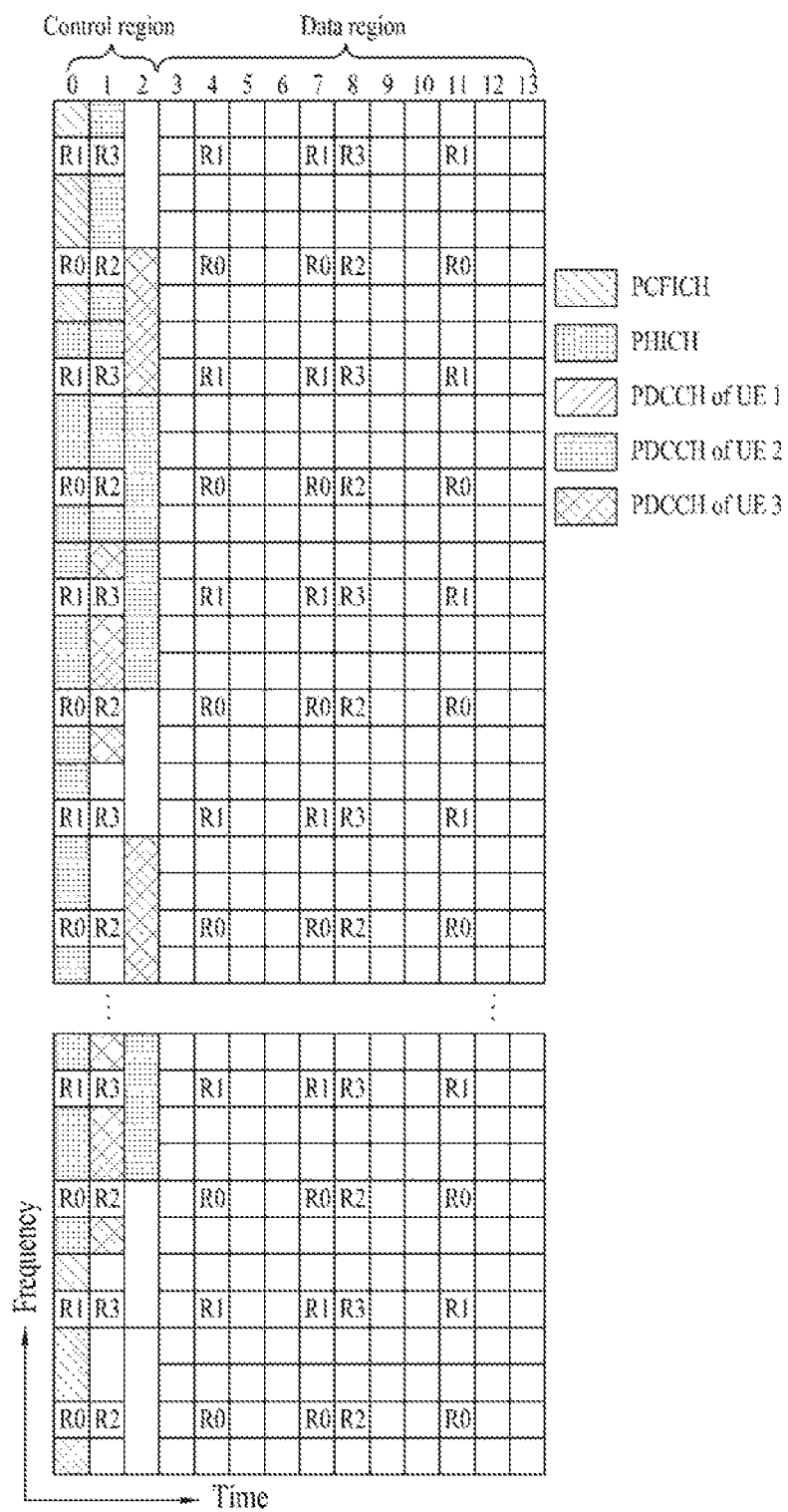
FIG. 5 is a diagram showing the structure of a downlink radio frame used in an LTE system.

FIG. 5 is a diagram showing a control channel included in a control region of a subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or a pilot signal for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is set prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to transmit HARQ ACK/NACK for uplink transmission. That is, the PHICH indicates a channel for transmitting DL ACK/NACK information for UL HARQ. The PHICH includes one REG and is scrambled on a cell-specific basis. ACK/NACK is indicated by one bit and is modulated by binary phase shift keying (BPSK). The modulated ACK/NACK is spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in a frequency domain and/or a time domain, in order to obtain diversity gain.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
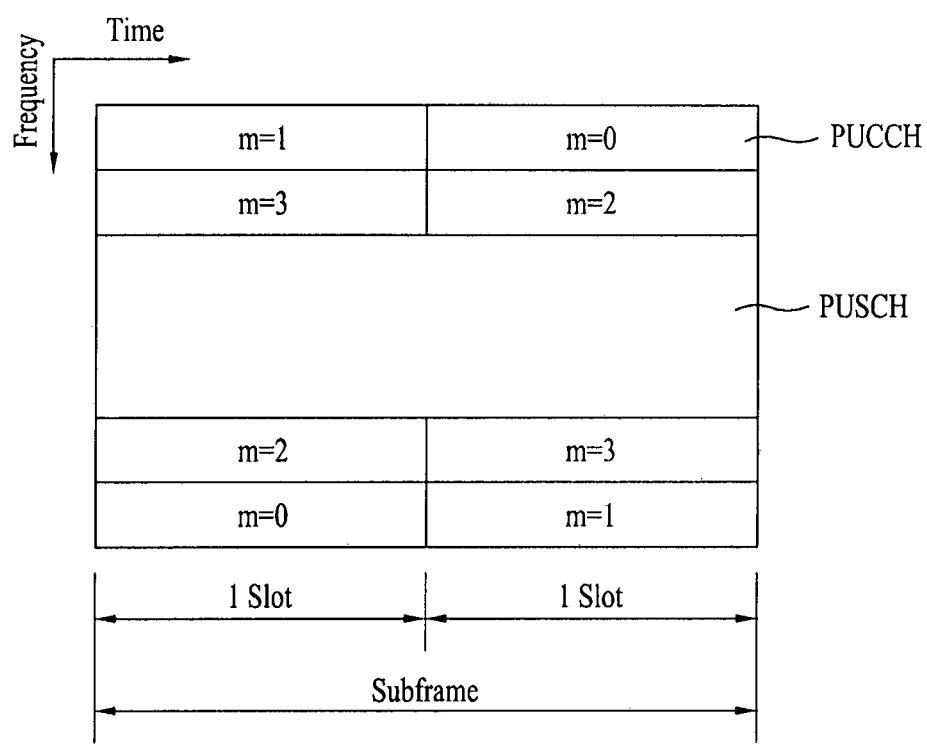
FIG. 6 is a diagram showing the structure of an uplink subframe used in an LTE system.

FIG. 6 is a diagram showing the structure of an uplink subframe used in an LTE system.

Referring to FIG. 6, the uplink subframe may be divided into a region to which a PUCCH for transmitting control information is allocated and a region to which a PUSCH for transmitting user data is allocated. An intermediate portion of the subframe is allocated to the PUSCH, and both sides of a data region are allocated to the PUCCH in the frequency domain. The control information transmitted on the PUCCH includes the ACK/NACK used for HARQ, a Channel Quality Indicator (CQI) indicating a downlink channel state, a Rank Indicator (RI) for MIMO, and a Scheduling Request (SR) of an uplink resource allocation request. The PUCCH for one UE uses one resource block occupying different frequencies in each slot within the subframe. That is, two resource blocks allocated to the PUCCH are frequency-hopped in a slot boundary. FIG. 6 shows the case where a PUCCH having m=0, a PUCCH having m=1, a PUCCH having m=2, and a PUCCH having m=3 are allocated to the subframe.

In a current wireless communication environment, as various devices requiring machine-to-machine (M2M) communication and high data transmission has appeared and diffused, data demand of a cellular network has rapidly increased. In order to satisfy high data demand, communication technology has been developed to carrier aggregation technology for efficiently using more frequency bands, multi-antenna technology for increasing data capacity within a restricted frequency, multiple base station cooperation technology, etc. and a communication environment has been evolved such that the density of accessible nodes located around a user is increased. A system having nodes, the density of which is high, may have higher system performance by cooperation between nodes. Such a method provides better performance than the case in which the nodes do not cooperate, because each node serves as an independent base station (BS), an advanced BS (ABS), a node-B (NB), an eNode-B (eNB), an access point (AP), etc.

Such a node may be implemented in the form of a remote radio head (RRH) or an antenna node (AN) of a distributed antenna system (DAS). DAS means a system for, at a single BS, managing antennas located at various locations within a cell, unlike a centralized antenna system (CAS) in which antennas are concentrated at the center of a cell. The DAS is different from a femto/pico cell in that several antenna nodes configure one cell.

Initially, the DAS is used to repeatedly transmit a signal by mounting more antennas in order to cover a shadow area. However, the DAS is regarded as a MIMO system in that BS antennas simultaneously transmit and receive several data streams so as to support one or several users. In addition, the MIMO system is recognized as an essential factor for satisfying next-generation communication requirements due to high frequency efficiency. From the viewpoint of the MIMO system, the DAS has high power efficiency obtained by decreasing a distance between a user and an antenna to be less than that of the CAS, high channel capacity due to low correlation and interference between BS antennas and communication performance with relatively uniform quality regardless of the location of a user within a cell.

FIG. 7 is a diagram showing the configuration of a DAS in a next-generation communication system.

Referring to FIG. 7, the DAS includes a BS and antenna nodes connected to the BS. Each antenna node is connected to the BS by wire or wirelessly and may include one or several antennas. In general, antennas belonging to one antenna node belong to the same spot, a distance between closest antennas is several meters or less, and the antenna node serves as an AP accessible by a user equipment (UE). In the existing DAS, generally, an antenna node is equated with an antenna. However, in order to efficiently manage the DAS, a relationship between the antenna node and the antenna should be clearly defined.

FIG. 8 is a diagram showing the concept of a BTS hotel in a DAS.

FIG. 8(*a*) shows an existing cellular system. One base transceiver station (BTS) controls three sectors and is connected to a base station controller (BSC)/radio network controller (RNC) over a backbone network.

However, in the DAS shown in FIG. 8(*b*), BTSs respectively connected to each AN are mounted at one place. This is referred to as a BTS hotel. In this case, it is possible to reduce cost of land and building where the BTS is mounted and to easily maintain and manage the BTS. By mounting the BTS and the MSC/BSC/RNC at one place, it is possible to significantly increase backhaul capacity.

Figure 9:
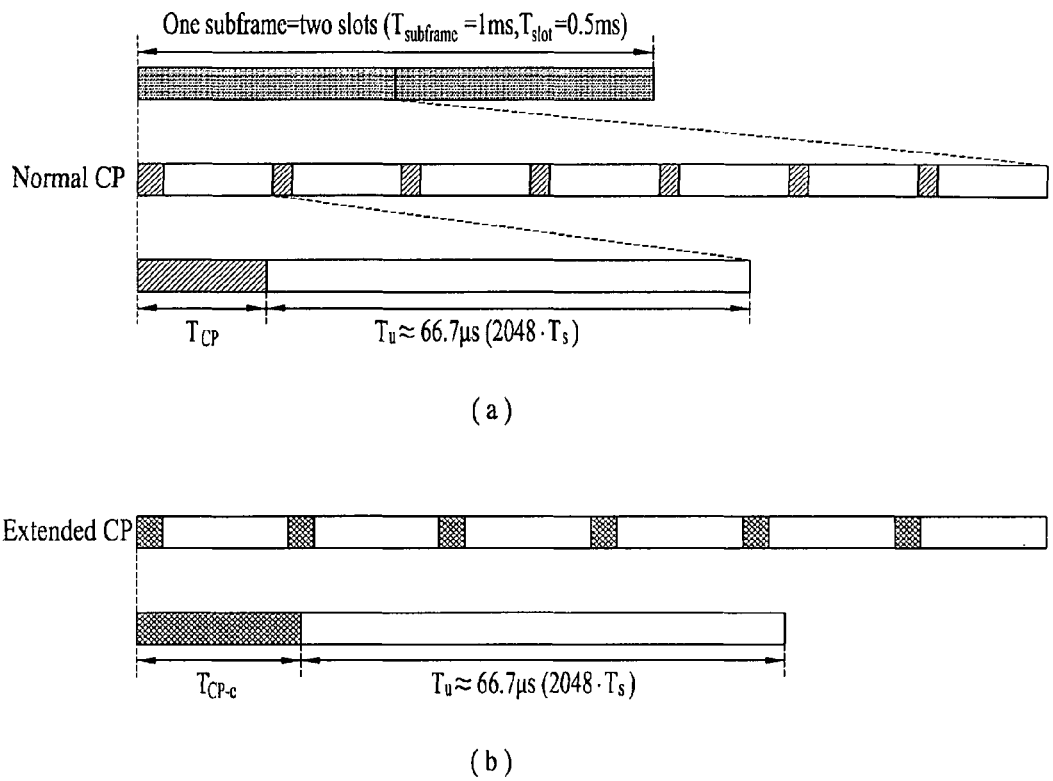
FIG. 9 is a diagram showing the structure of a frame of an existing LTE system.

FIG. 9 is a diagram showing the structure of a frame of an existing LTE system. In particular, FIG. 9(*a*) shows a normal cyclic prefix (CP) case and FIG. 9(*b*) shows an extended CP case.

In the LTE system, as shown in FIG. 9, two frame structures are supported, in order to enable the LTE system to support various scenarios of a cellular system. Actually, the LTE system covers an indoor cell, an urban cell, a suburban cell, a rural cell, etc. and a movement speed of a UE include up to 350 to 500 km [단위 확인 요망]. The center frequency of the LTE system is generally 400 MHz to 4 GHz and an available frequency band is 1.4 to 20 MHz. This means that delay spread and Dopper frequency may vary according to the center frequency and the available frequency band.

Referring to FIG. 9, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHZ} \times 2048)=3.2552 \times 10^{-8} \approx 33$ ns.

In a normal CP case, a CP length $T_{CP}$ is $160 \times T_s$ which is about 5.1 μs in a first symbol. In other symbols, a subcarrier spacing Δf is 15 kHz and a CP length $T_{CP}$ is $144 \times T_s$ which is about 4.7 μs. However, in an extended CP case, a subcarrier spacing Δf is equal to 15 kHz but a CP length $T_{CP}$ is $512 \times T_s$ which is about 16.7 μs.

Accordingly, the extended CP may support a relatively wide suburban cell or rural cell due to a long CP length. In general, since delay spread is increased in a suburban or a rural cell, in order to solve inter symbol interference (ISI), an extended CP having a relatively large length is necessary. However, there is a trade-off that frequency efficiency/transmission resource loss occurs due to increase in relative overhead.

In the future, introduction of a local area into the LTE system has been examined. That is, in order to enhance service support per user, new cell deployment based upon the concept of "local area access" is expected to be introduced.

Figure 10:
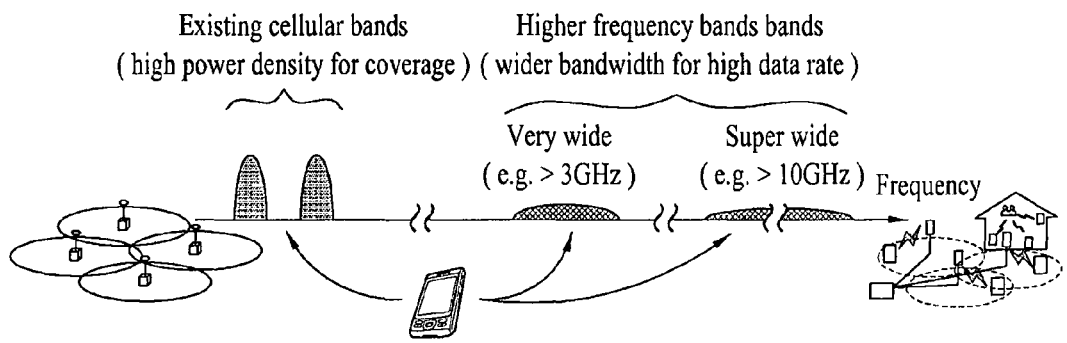
FIG. 10 is a diagram showing the concept of a small cell which is expected to be introduced into an LTE system in the future.

FIG. 10 is a diagram showing the concept of a small cell which is expected to be introduced into an LTE system in the future.

Referring to FIG. 10, a wider system bandwidth may be set in a band having a center frequency higher than that of a frequency band managed in the existing LTE system. In addition, basic cell coverage is supported based on a control signal such as system information through the existing cellular band and data transmission for maximizing transmission efficiency may be performed using a wider frequency bandwidth in a high-frequency small cell. Accordingly, the concept of "local area access" is used for low-to-medium mobility UEs located in a narrower region and small cells in which a distance between a UE and a BS has a unit of 100 m which is less than that of a cell in which a distance between a UE and a BS has a unit of km.

In such cells, since the distance between the UE and the BS is short and a high frequency band is used, the following channel properties may be predicted.

First, from the viewpoint of delay spread, as a distance between a BS and a UE is decreased, signal delay may be decreased. If the same OFDM frame as the LTE system is applied, since the allocated frequency band is relatively large, a frequency spacing may be set to a value significantly greater than 15 kHz. Finally, from the viewpoint of Dopper frequency, since a high frequency band is used, a Dopper frequency higher than a low frequency band of the same UE speed appears and thus a coherent time may be dramatically decreased. Here, the coherent time means a time when a channel is static or uniform. For reference, coherent bandwidth means a bandwidth which is static or uniform with time.

In the present invention, a flexible frame structure for a small cell (or local area access) which is expected to be introduced in the future is proposed and various embodiments considering the properties of a frequency band of a small cell are provided.

In general, channel delay spread tends to be decreased in a high frequency band having a center frequency of 5 GHz or more and channel path loss is significantly increased in a high frequency band, such that stable performance may be assured only near a BS. The same OFDM is expected to be used for a multiple access scheme of a small cell in the future and the frame structure needs to be changed in consideration of the properties of the high frequency band.

In generation of OFDM symbols, a CP is necessarily inserted into a front portion of OFDM/OFDMA symbols in order to prevent ICI. However, in the current LTE system, the normal CP length is 4.5 μs and the extended CP length is 16.7 μs as described above. However, since a small cell has relatively short delay spread, a long CP length does not need to be maintained and a very short CP length may be set according to circumstances. Such decrease in CP length leads to increase in transmission resources. As a result, it is possible to increase frequency efficiency.

However, dramatically reducing all CP lengths may produce adverse effect in timing synchronization acquisition. More specifically, in the LTE system, generally, initial timing is acquired through a cell search and synchronization procedure. At this time, correlation between CPs or correlation between reference signals such as cell-specific reference signals may be simultaneously used. Accordingly, if the CP length is dramatically short, it may be difficult to acquire accurate timing synchronization. In addition, in actual implementation, since a CP is used as an important factor for measuring a frequency offset through correlation to implement a modem, it is necessary to ensure a minimum CP length.

For this reason, a relatively long CP length must be included in the frame structure. Hereinafter, it is assumed that a CP having a relatively long length is referred to as a first CP and a CP having a short length is referred to as a second CP.

First Embodiment

First, in setting of a frame for a small cell, a CP length may be variably set. Since the small cell provides a service to UEs located in a relatively narrow coverage, delay spread is short and a probability that ISI occurs is lower than that of general low-frequency cellular communication. Accordingly, the small cell may be set to a second CP having a relatively short length as compared to the existing system and may be set to 0.

1) First, in CP length change, a subframe period/frame period may be fixed and an OFDM symbol length may vary. In this case, two approaches for suiting the fixed frame period are necessary.

First, a subcarrier spacing on a frequency axis is fixed and the number of OFDM symbols on a time axis is adjusted to correspond to the fixed frame period. For example, if a subcarrier space is $\Delta f$, a valid OFDM symbol period $T_{DFT}$ may be expressed by a relationship shown in Equation 8.

$$T_{DFT} = \frac{1}{\Delta f} \qquad \text{⟨Equation 8⟩}$$

In addition, a final OFDM symbol period $T_{SYM}$ with a CP attached thereto may be expressed by Equation 9 below.

$$T_{SYM} = T_{CP} + T_{DFT} \qquad \text{<Equation 9>}$$

Since the subframe includes N OFDM symbols, a subframe period $T_{SYM}$ may be expressed by Equation 10.

$$T_{sf} = N \times T_{SYM} \qquad \text{<Equation 10>}$$

Since the subcarrier spacing $\Delta f$ is fixed, the valid OFDM symbol period $T_{DFT}$ is fixed. Accordingly, if the CP length $T_{CP}$ is decreased, the number N' of OFDM symbols configuring a single subframe is increased (N'>N)) and, if the CP length $T_{CP}$ is increased, the number N' of OFDM symbols is decreased (N'<N)).

Figure 11:
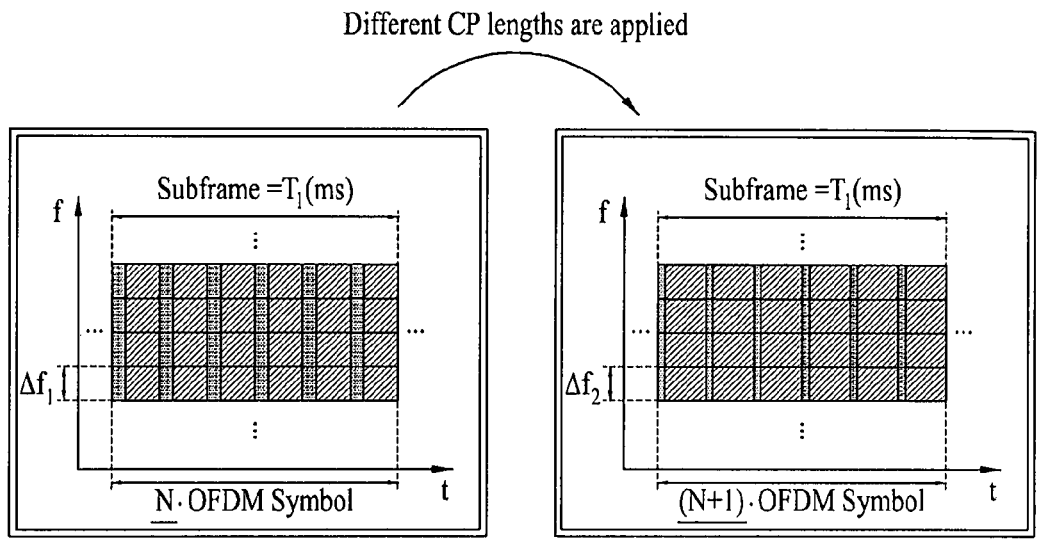
FIG. 11 is a diagram showing an example in which the number of OFDM symbols is changed according to different cyclic prefix (CP) lengths in a subframe having the same time length.

FIG. 11 is a diagram showing an example in which the number of OFDM symbols is changed according to different cyclic prefix (CP) lengths in a subframe having the same time length.

Referring to FIG. 11, it can be seen that subcarrier spacings $\Delta f_1$ and $\Delta f_2$ are the same even when the number of OFDM symbols configuring the subframe is changed from N to (N+1) due to change in CP length.

2) Next, in CP length change, the number of OFDM symbols on a time axis may be fixed and a subcarrier spacing $\Delta f$ on a frequency axis may be adjusted to correspond to the fixed frame period. Accordingly, since the number of OFDM symbols configuring a single subframe is fixed, a subframe period configuration due to change in CP length is adjusted by changing the subcarrier spacing.

As shown in Equation 8 above, the subcarrier spacing $\Delta f$ is a reciprocal of the valid OFDM symbol period $T_{DFT}$. Here, the subframe period is equal to Equation 10 but the final OFDM symbol $T_{SYM}$ with the CP attached thereto may be changed to and expressed by Equation 11 below.

$$T_{SYM} = \hat{T}_{CP} + \hat{T}_{DFT} \qquad \text{<Equation 11>}$$

In Equation 11, $\hat{T}_{CP}$ is different from $T_{CP}$ and $\hat{T}_{DFT}$ is also different from $T_{DFT}$.

Figure 12:
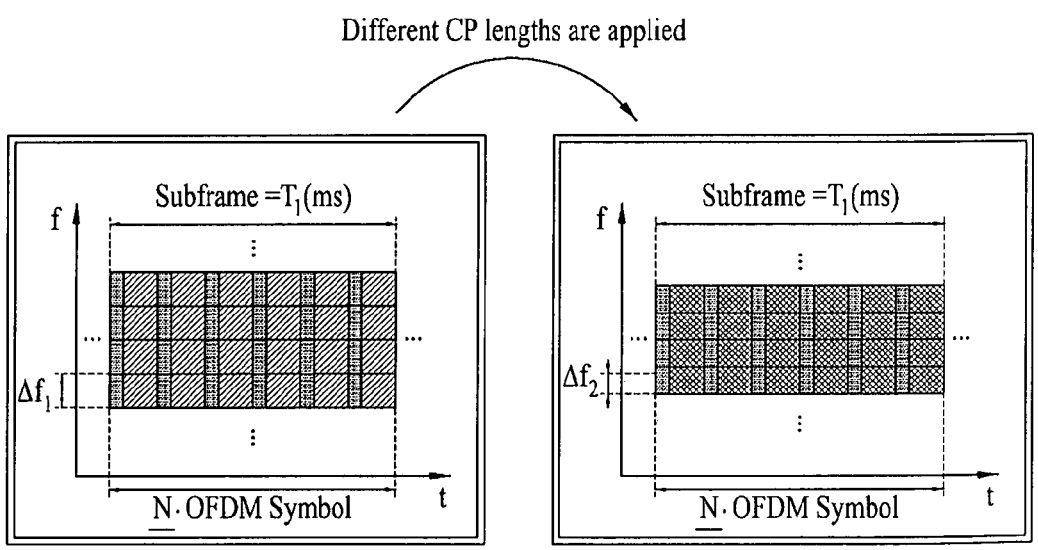
FIG. 12 is a diagram showing an example in which a subcarrier spacing and a valid OFDM symbol period are changed according to different CP lengths in a subframe having the same time length.

FIG. 12 is a diagram showing an example in which a subcarrier spacing and a valid OFDM symbol period are changed according to different CP lengths in a subframe having the same time length.

Referring to FIG. 12, it can be seen that the number of OFDM symbols configuring the subframe is equal to N before and after different CP lengths are applied. As a result, the CP length is decreased, the valid OFDM symbol period is increased, and thus the subcarrier spacing is decreased ($\Delta f_2 (< \Delta f_1)$). In other words, it can be seen that the valid OFDM symbol length $T_{DFT,2} (> T_{DFT,1})$ is increased. In this case, since a sampling time $T_s$ and a chip time are changed, a variable FFT/IFFT structure due to change in OFDM symbols must be included.

3) In CP length increase, the OFDM symbol period may be fixed and the subframe/frame period may be variably set. As a result, the total frame period is changed.

The variable CP length is configured according to the purpose and requirements of the system and initially set OFDM symbols are fixed. Accordingly, even when the CP length is changed, the total subframe period is set according to the CP length and thus a single subcarrier spacing is not changed. Accordingly, the existing OFDM modulation/demodulation block is used without change.

In contrast, in the case in which the number of OFDM symbols and the subcarrier spacing $\Delta f$ are not changed, the subframe period is decreased if the CP length is decreased and is increased if the CP length is increased.

Second Embodiment

Next, in settings of a frame for a small cell, in order to acquire synchronization with a BS and to measure a frequency offset, a subframe/frame having CPs having various lengths may be configured.

The CP inserted to prevent ISI of OFDM symbols is also used to acquire a timing offset and a frequency offset. Accordingly, a CP length for acquiring a minimum offset value must be ensured. However, it is not necessary to insert the first CP into all symbols in order to acquire such an offset value. By periodically inserting the first CP and providing the information to the UE, it is possible to solve a timing offset and frequency offset acquisition problem. Such frame setting information may be set using a predefined method when configuring the system or sent to the UE through separate signaling.

A) In order to simultaneously apply the first CP and the second CP, first, a plurality of CP types may be applied to the subframe.

Figure 13:
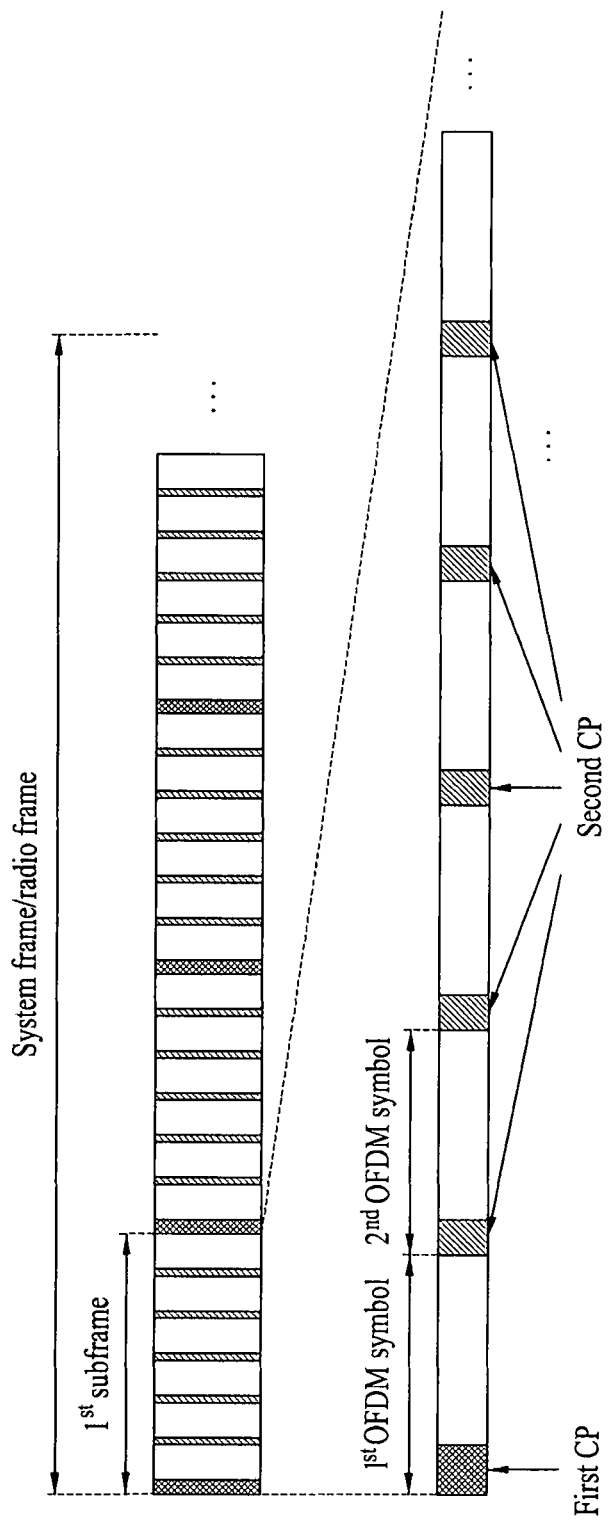
FIG. 13 is a diagram showing an example in which a plurality of CP types is applied to one subframe according to a second embodiment of the present invention.

FIG. 13 is a diagram showing an example in which a plurality of CP types is applied to one subframe according to a second embodiment of the present invention.

Referring to FIG. 13, the first CP is inserted into only a first symbol of the subframe and the second CP is inserted into the remaining symbols. Although a subframe including only the first CP and the second CP is shown in FIG. 13 for convenience, a third CP, a fourth CP, etc. may be further included.

An example of such a structure, in the existing LTE system, a synchronization channel (PSS/SSS) is present in subframes #0 and #5 and a PBCH which is system information is transmitted. Accordingly, different CP structures may be applied to specific OFDM symbols and the remaining OFDM symbols such that the existing UE acquires the same subframe synchronization and system information.

B) Next, in order to simultaneously apply the first CP and the second CP, the same CP length is applied to one subframe but different CPs may be applied to different subframes.

Figure 14:
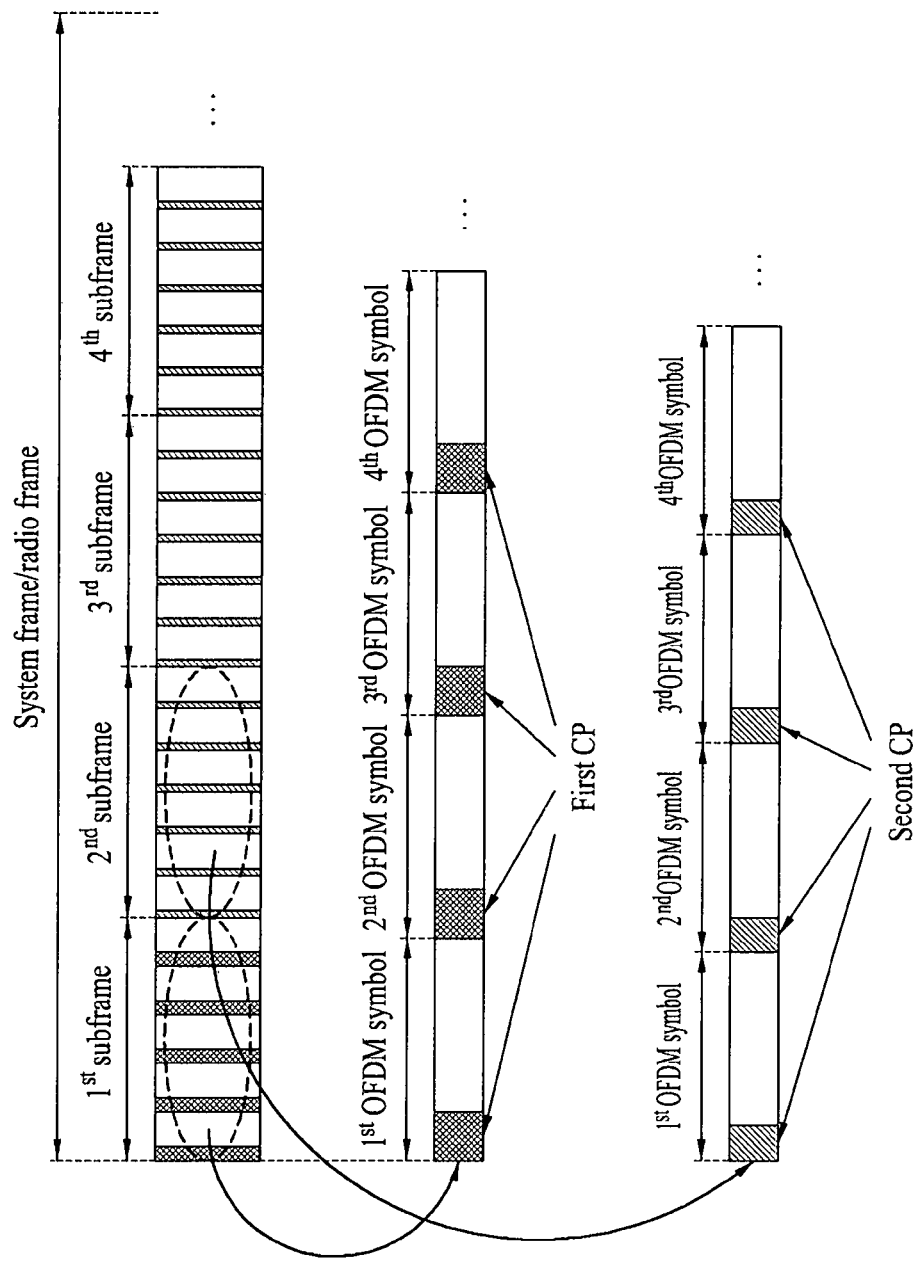
FIG. 14 is a diagram showing an example in which a plurality of CP types is applied to one radio frame or one system frame according to a second embodiment of the present invention.

FIG. 14 is a diagram showing an example in which a plurality of CP types is applied to one radio frame or one system frame according to a second embodiment of the present invention.

Referring to FIG. 14, the first CP is inserted into all symbols of some subframes of a system frame or a radio frame and the second CP is inserted into the remaining subframes. Similarly, although an example in which a first subframe includes only the first CP and the remaining subframes include only the second CP is shown in FIG. 14 for convenience, a third CP, a fourth CP, etc. may be further included.

FIG. 15 is a block diagram showing the configuration of a communication apparatus according to an embodiment of the present invention.

Referring to FIG. 15, a communication apparatus 1500 includes a processor 1510, a memory 1520, a Radio Frequency (RF) module 1530, a display module 1540 and a user interface module 1550.

The communication apparatus 1500 is shown for convenience of description and some modules thereof may be omitted. In addition, the communication apparatus 1500 may further include necessary modules. In addition, some modules of the communication apparatus 1500 may be subdivided. The processor 1510 is configured to perform an operation of the embodiment of the present invention described with reference to the drawings. For a detailed description of the operation of the processor 1510, reference may be made to the description associated with FIGS. 1 to 14.

The memory 1520 is connected to the processor 1510 so as to store an operating system, an application, program code, data and the like. The RF module 1530 is connected to the processor 1510 so as to perform a function for converting a baseband signal into a radio signal or converting a radio signal into a baseband signal. The RF module 1530 performs analog conversion, amplification, filtering and frequency up-conversion or inverse processes thereof. The display module 1540 is connected to the processor 1510 so as to display a variety of information. As the display module 1540, although not limited thereto, a well-known device such as a Liquid Crystal Display (LCD), a Light Emitting Diode (LED), or an Organic Light Emitting Diode (OLED) may be used. The user interface module 1550 is connected to the processor 1510 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method of configuring a CP for a small cell in a wireless communication system and an apparatus therefor to a 3GPP LTE system has been described, the present invention is applicable to various wireless communication systems in addition to the 3GPP LTE system.

The invention claimed is:

1. A method of transceiving a signal between a transmitter and a receiver in a wireless communication system, the method comprising:
    transceiving the signal in units of a subframe including a plurality of symbols,
    wherein each of the plurality of symbols consists of a valid symbol and a cyclic prefix,
    wherein the cyclic prefix is a first cyclic prefix or a second cyclic prefix,
    wherein a length of the second cyclic prefix is shorter than a length of the first cyclic prefix,
    wherein a number of the plurality of symbols in the subframe varies on a time axis based on a length of the cyclic prefix,
    wherein only a first symbol of the subframe includes the first cyclic prefix and remaining symbols of the subframe include the second cyclic prefix, and
    wherein each symbol used for transmitting a synchronization signal among the plurality of symbols includes the first cyclic prefix.

2. The method according to claim 1, wherein, the synchronization signal includes a primary synchronization signal or a secondary synchronization signal.

3. The method according to claim 1, wherein a number of symbols on a frequency axis is fixed in the subframe.

4. An apparatus for transceiving a signal in a wireless communication system, the apparatus comprising:
    a transceiver configured to transceive signals; and
    a processor configured to:
        control the transceiver; and
        tranceive the signal from a transmitter in units of a subframe including a plurality of symbols,
    wherein each of the plurality of symbols consists of a valid symbol and a cyclic prefix,
    wherein the cyclic prefix is a first cyclic prefix or a second cyclic prefix,
    wherein a length of the second cyclic prefix is shorter than a length of the first cyclic prefix,
    wherein a number of the plurality of symbols in the subframe varies on a time axis based on a length of the cyclic prefix,
    wherein only a first symbol of the subframe includes the first cyclic prefix and remaining symbols of the subframe include the second cyclic prefix, and
    wherein each symbol used for transmitting a synchronization signal among the plurality of symbols includes the first cyclic prefix.

5. The apparatus according to claim 4, wherein the synchronization signal includes a primary synchronization signal or a secondary synchronization signal.

6. The apparatus according to claim 4, wherein a number of symbols on a frequency axis is fixed in the subframe.

* * * * *